United States Patent [19]

Konno

[11] Patent Number: 4,703,466
[45] Date of Patent: Oct. 27, 1987

[54] DEVICE AND METHOD FOR CONTROLLING MOVEMENT OF FOCUSING LENS FOR OPTICAL DISK READING APPARATUS

[75] Inventor: Yoshikiyo Konno, Saitama, Japan

[73] Assignee: Pioneer Electronic Corporation, Tokyo, Japan

[21] Appl. No.: 667,798

[22] Filed: Nov. 1, 1984

[30] Foreign Application Priority Data

Nov. 1, 1983 [JP] Japan .............................. 58-169558

[51] Int. Cl.$^4$ .............................................. G11B 7/00
[52] U.S. Cl. ........................................ 369/45; 250/201
[58] Field of Search ..................... 369/43, 44, 45, 46; 358/342; 250/201 DF

[56] References Cited

U.S. PATENT DOCUMENTS 4,128,847 12/1978 Roullet et al. .
4,541,084 9/1985 Oku et al. .............................. 369/45
4,546,460 10/1985 Ando .................................... 369/45

FOREIGN PATENT DOCUMENTS 0036222 9/1981 European Pat. Off. .

*Primary Examiner*—Robert L. Richardson
*Attorney, Agent, or Firm*—Sughrue, Mion, Zinn, Macpeak, and Seas

[57] ABSTRACT

A device and method for controlling the movement of a focusing lens of an apparatus for reading an optical disk in which the focusing lens is positively prevented from striking the surface of the disk. The presence or absence of the establishment of a focus servo control mode is detected when the focusing lens is moved from a most wide position to the vicinity of the normal operative position. If the focus servo control mode is not established when the focusing lens has been moved to the vicinity of the normal operative position, the focusing lens is then moved away from the disk. Then, the focusing lens is moved towards the disk one more time, and the procedure is repeated.

1 Claim, 3 Drawing Figures

DEVICE AND METHOD FOR CONTROLLING MOVEMENT OF FOCUSING LENS FOR OPTICAL DISK READING APPARATUS

BACKGROUND OF THE INVENTION

The present invention relates to a device and method for controlling the movement of a focusing lens in an apparatus for reading recorded information.

An optical information readout apparatus reads out information recorded on a disk by illuminating the disk surface with a pickup beam spot and receiving a beam reflected from or passing through the recorded surface. Since it is necessary to focus the spot beam accurately on the disk surface at all times, the readout apparatus is provided with a focus servo unit for controlling the position of a focusing lens.

In the focus servo unit, no focus error signal is produced when the focusing lens thereof is positioned at a distance $D_0$ from the disk surface where the spot beam is accurately focused on the disk surface. When the distance between the focusing lens becomes greater or smaller than the distance $D_0$, an error signal is generated which has a magnitude dependent on the amount of deviation of the focusing lens and polarity dependent on the direction of deviation of the focusing lens. The focus error signal therefore has a so-called S-curve characteristic. A motor for driving the focusing lens is controlled by the focus error signal to move the focusing lens towards or away from the disk surface for maintaining the focused condition of the spot beam correctly on the disk surface at all times, even if the disk surface is warped.

Before the recorded information is read out, the focusing lens is normally placed in a most widely spaced relation to the disk surface. If the focus servo loop were actuated in that state, no usable focus error signal could be obtained. Therefore, the focus servo loop is turned off (opened) at first, and a start signal is applied from an external source to energize the lens driving motor for moving the focusing lens to a position spaced approximately distance $D_0$ from the disk surface. Then, the focus servo loop is turned on to enable focus servo control.

FIG. 1 of the accompanying drawings is a block diagram of a conventional arrangement of such a focus servo unit and a device for controlling the movement of a focusing lens. A focus error signal as defined above is applied through a servo loop switch 1 and an adder 2 to a positive input terminal of a drive amplifier 3 which issued an output signal through a buffer amplifier 4 as a drive signal to a motor M for moving a focusing lens (not shown). Prior to initiating the servo control mode, the adder 2 is supplied with a start signal from a controller (not shown) through a resistor $R_1$ for a certain period of time.

The motor M and resistors $R_2$ through $R_4$ jointly constitute a bridge circuit having a pair of terminals a and b, between which the drive signal from the drive amplifier 3 is applied, and another pair of terminals c and d, the voltage between which is applied as an input signal to a differential amplifier 5. The differential amplifier 5 issues an output signal through a switch 6 and a resistor $R_5$ to a negative input terminal of the drive amplifier 3. Resistors $R_6$ and $R_7$ constitute a negative feedback circuit for the drive amplifier 4.

In operation, when a focus ON signal is generated by the controller, the switch 6 is turned on and a start signal of a substantially constant level is applied through the adder 2 to the positive input terminal of the drive amplifier 3 thereby to energize the motor M. If the bridge circuit including the motor M is in a state of equilibrium at this time, one differential input terminal of the differential amplifier 5 is supplied with a voltage dependent on the counterelectromotive force generated across the coil of the motor M. While the switch 6 is closed, a servo loop composed of the bridge circuit including the motor M, the differential amplifier 5, and the drive amplifier 3 is formed and operates to maintain constant the speed of rotation of the motor M. Thus, a fixed-speed servo circuit arrangement is established for moving the focusing lens at a constant speed. As the focusing lens approaches the disk surface in the vicinity of the normal distance $D_0$, the presence of the S-curve characteristic of the focus error signal is detected to turn on the servo loop switch 1 and turn off the switch 6. Therefore, the focus servo loop is actuated to thus control the motor M with the focus error signal in a normal focus servo control mode.

Where, however, the focus servo control is rendered unstable or the motor M is out of the focus servo control range due to some disturbance, the motor M is energized by the start signal applied from the controller for the certain period of time, thereby sometimes causing the focusing lens to excessively approach or hit the disk surface.

The present invention has been made to eliminate the foregoing difficulties of the conventional focusing device.

It is an object of the present invention to provide a device for controlling the movement of a focusing lens to thereby reliably prevent the focusing lens from impinging upon the disk.

In accordance with a device and method for controlling the movement of a focusing lens according to the present invention, the focusing lens is moved in a direction away from the disk if the device is not in a focus servo control mode after the focusing lens has been moved into a normal operative position. Thereafter, the focusing lens is moved again into the vicinity of the normal operative position.

DESCRIPTION OF THE PREFERRED EMBODIMENTS

A preferred embodiment of the present invention will hereinafter be described with reference to the drawings.

Figure 1:
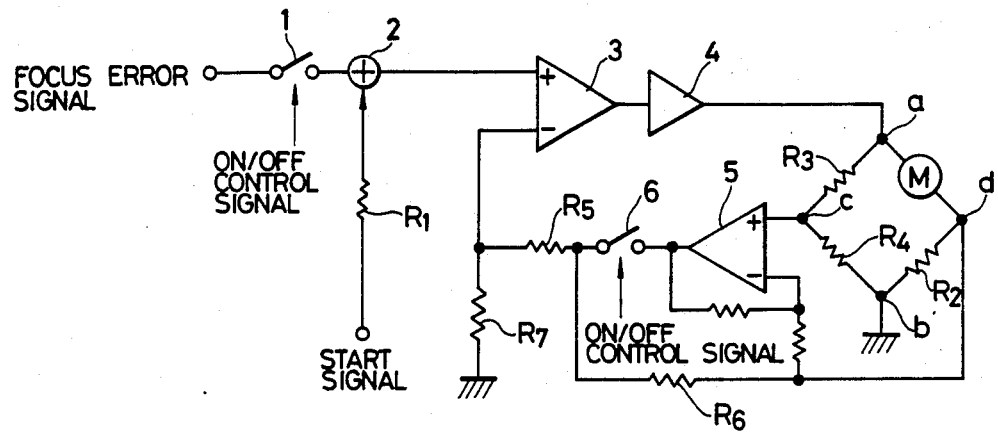
FIG. 1 is a block diagram of a conventional focusing device.
Figure 2:
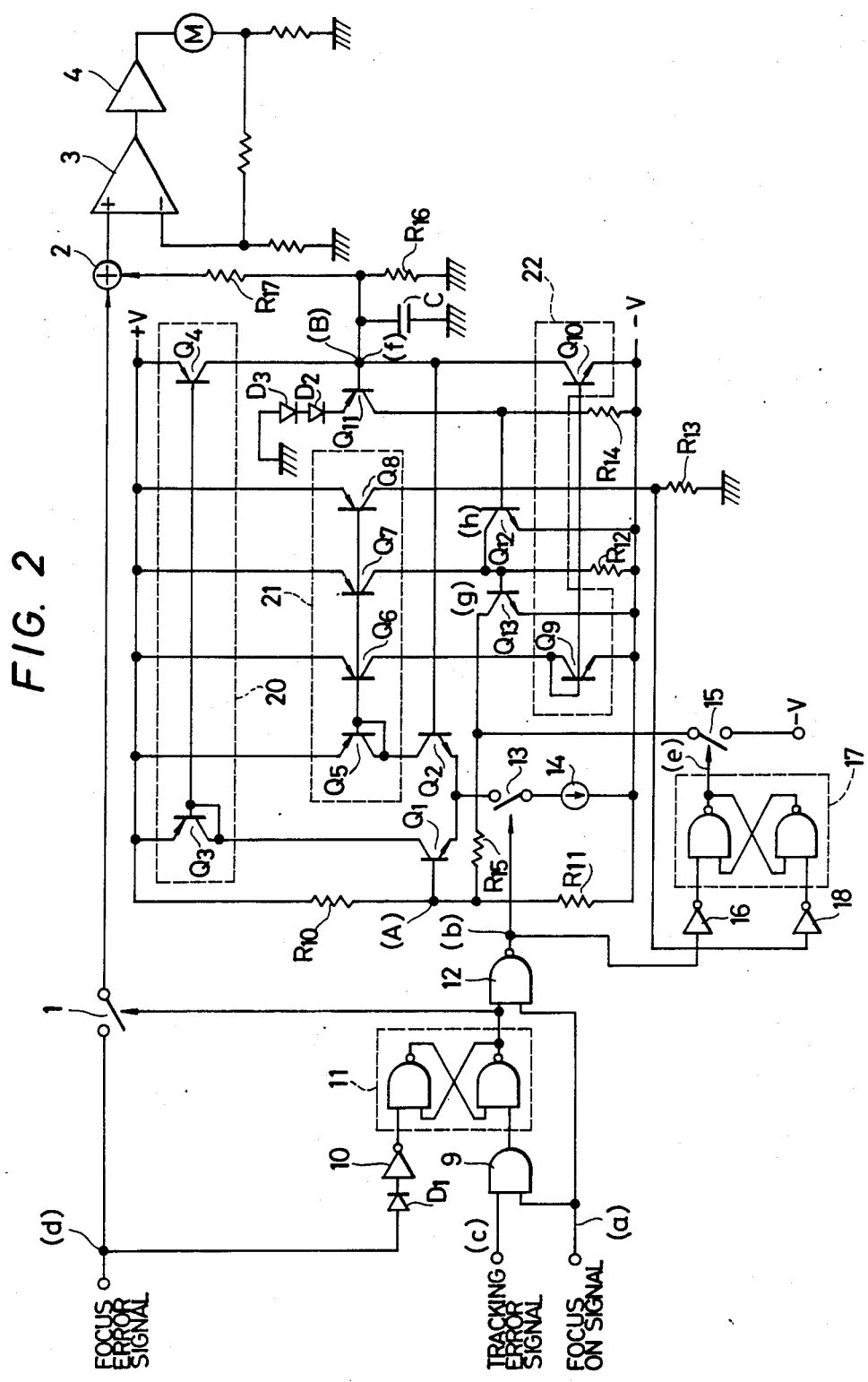
FIG. 2 is a circuit diagram of a focusing device according to the present invention.

Like or corresponding parts in FIG. 2 are denoted by like or corresponding reference numerals and characters in FIG. 1. A focus error signal is applied through a servo loop switch 1 to an input terminal of an adder 2, and also through a diode $D_1$ and an inverter 10 to a set input terminal of a flip-flop 11. The flip-flop 11 produces an output signal which is applied to one input terminal of a NAND gate 12 and which also serves as an ON/OFF control signal for the servo loop switch 1. The ON/OFF control signal turns on the switch 1 when the signal is at a low level. An AND gate 9 is supplied with a tracking error signal and a focus ON signal applied from a controller (not shown) and issues an output signal to a reset input terminal of the flip-flop 11. The focus ON signal is also fed to the other input terminal of the NAND gate 12.

Transistors $Q_1$ and $Q_2$ jointly form a differential pair with their emitters connected in common to a power supply terminal $-V$ through a switch 13 and a constant-current regulated power supply 14. The transistor $Q_1$ has a base connected to a common junction A between resistors $R_{10}$ and $R_{11}$, which are connected in series between a power supply terminal $+V$ and the power supply terminal $-V$. The transistor $Q_1$ has a collector connected through a transistor $Q_3$ serving as a diode to the power supply terminal $+A$. The transistor $Q_3$ and a transistor $Q_4$ coupled between the power supply terminal $+V$ and a junction B jointly constitute a current mirror circuit 20. A transistor $Q_5$, serving as a diode and connected between the transistor $Q_2$ and the power supply terminal $+V$, and transistors $Q_6$, $Q_7$ and $Q_8$ jointly constitute a current mirror circuit 21. The transistor $Q_6$ has a collector connected to the power supply terminal $-V$ through a transistor $Q_9$ serving as a diode. The transistor $Q_7$ has a collector connected through a resistor $R_{12}$ to the power supply terminal $-V$. The transistor $Q_8$ has a collector connected to ground via a resistor $R_{13}$. The transistor $Q_9$ and a transistor $Q_{10}$, coupled between the junction B and the power supply terminal $-V$, jointly constitute a current mirror circuit 22.

To the junction B there are connected the base of the transistor $Q_2$ and the base of a transistor $Q_{11}$, which has an emitter grounded through diodes $D_2$ and $D_3$ and a collector connected through a resistor $R_{14}$ to the power supply terminal $-V$. A transistor $Q_{12}$ has a collector coupled to the collector of the transistor $Q_7$ and an emitter connected to the power supply terminal $-V$. To the collector of the transistor $Q_{12}$ there is connected the base of a transistor $Q_{13}$, which has a collector connected to the junction A through a resistor $R_{15}$ and to the power supply terminal $-V$ through a switch 15 and an emitter connected to the power supply terminal $-V$.

The NAND gate 12 issues an output signal applied through an inverter 16 to a set input terminal of the flip-flop 17, and also applied as an ON/OFF control signal for the switch 13. The ON/OFF control signal turns on the switch 13 when the signal is at a low level. An output signal from the collector of the transistor $Q_8$ is applied via an inverter 18 to a reset input terminal of the flip-flop 17. The flip-flop 17 issues an output signal as an ON/OFF control signal for the switch 15. The ON/OFF control signal turns on the switch 15 when the signal is at a high level. The junction B is grounded through a parallel-connected circuit of a capacitor C and a resistor $R_{16}$. A voltage from the junction B is applied through a resistor $R_{17}$ to the other input terminal of the adder 2.

Figure 3:
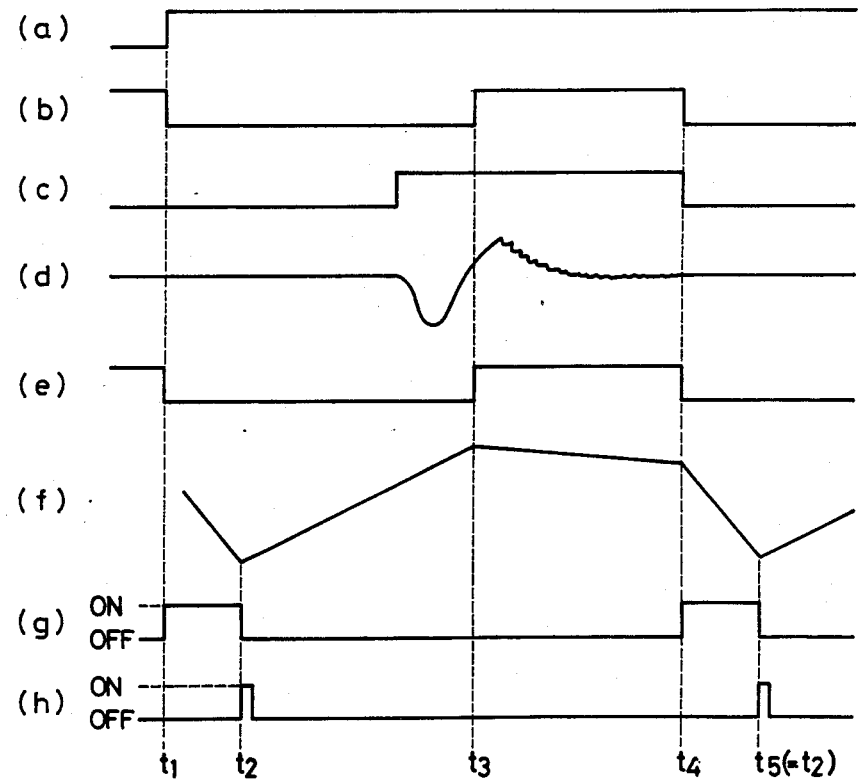
FIG. 3 (a) through 3 (h) show signal waveforms illustrative of operation of the device shown in FIG. 2.

The operation of the device thus constructed according to the present invention will be described with reference to the waveform diagram of FIG. 3.

While a focus ON signal (a) from the controller is at a low level, the NAND gate 12 issues an output signal (b) at a high level, turning off the switch 13. The current mirror circuits 20, 21 and 22 are turned off thereby, and the flip-flop 17 issues an output signal (e) at a high level to turn on the switch 15. Therefore, the junction A has a potential lower than a voltage (f) at the junction B, which is lower than the ground level by the voltage drop across three diodes ($0.6 \times 3 = 1.8$ V).

When the focus ON signal (a) goes high in level to give a focus ON command at a time $t_1$, the output signal (b) from the NAND gate 12 goes low to turn on the switch 13. The current mirror circuits 21 and 22 are now turned on to energize the transistor $Q_{10}$ so that the voltage (f0 at the junction B has a downward ramp waveform. Once the downward ramp waveform is generated, the output signal (e) of the flip-flop 17 goes low since its input signal is switched over, thereby to turn off the switch 15. As the switch 15 is turned off, the transistor $Q_{13}$ is energized as shown at (g) so that the potential at the junction A remains unchanged, that is, lower than the comparison level (f) at the junction B.

When the comparison level (f) at the junction B is lower than $-1.8$ V (corresponding to the voltage drop across the three diodes), the transistor $Q_{11}$ is rendered conductive. The transistor $Q_{12}$ is also rendered conductive as indicated by (h), and the transistor $Q_{13}$ is rendered nonconductive as indicated by (g). Therefore, the potential at the point A becomes higher than the comparison level at the junction B. At this time ($t_2$), the transistor $Q_{19}$ is turned off and the transistor $Q_4$ is turned on to cause the voltage (f) at the junction B to have an upward ramp waveform. As the voltage (f) is increased, energizing the motor M to move the focusing lens toward a focusing position, a tracking error signal (c) goes high. When a focus error signal (d) is higher than a threshold level (comparison level) of the inverter 10 at a time $t_3$, the flip-flop 11 is inverted to turn on the servo loop switch 1, thereby causing the output signal (b) of the NAND gate 12 to go high. The current mirror signals 20 through 22 are turned on, and then the output signal (e) from the flip-flop 17 is inverted to return to an initial condition to turn on the switch 15. The focus servo loop is then operated.

Where the servo control is rendered unstable due to a disturbance or the motor is forced out of servo control at a time $T_4$, the tracking error signal (c) goes low at that time to invert the flip-flop 11. The flip-flops 11 and 17 are now in their initial state, and the output signal from the NAND gate 12 goes low and the switch 15 is turned off so that the voltage (f) at the junction B has a downward ramp waveform. The focusing lens is then driven in a direction away from the disk by the voltage (f) at the junction B. During the interval between the times $t_3$ and $t_4$, the voltage (f) at the junction B is gradually lowered due to discharge through the resistor $R_{16}$, which has a high resistance value. This sequence of operations continues as long as there are present the tracking error signal (c) and the focus error signal (d) in the focused position after the focus ON command has been issued. Accordingly, the focusing lens is prevented from approaching the disk.

Since the flip-flop 17 is controlled by the output signal (b) of the NAND gate 12 and the ON/OFF operation of the transistor $Q_{10}$ for determining the ON/OFF timing of the switch 15, the initial ramp waveform of the output signal (f) at the junction B can be slanted downwardly for driving the focusing lens in a direction away from the disk. As a consequence, the focusing lens is reliably prevented from impinging upon the disk.

With the arrangement of the present invention, as described above, a device for controlling the movement of a focusing lens moves the focusing lens in a direction away from the disk if the device is not in a focus servo control mode after the focusing lens has been moved into the vicinity of a normal operative position. Thereafter, the device moves the focusing lens again into the vicinity of the normal operative position. Accordingly, the focusing lens control device of the invention reliably prevents the focusing lens from impinging upon the information-storage disk.

What is claimed is:

1. A device for controlling the movement of a focusing lens of an apparatus for reading an optical disk, comprising:
    servo loop switch means which is held open when a focus servo control mode is not established and is held closed when the focus servo control mode is established;
    adder means for adding (1) a focus error signal for the focus servo control fed through the servo loop switch means and (2) a focus lens drive voltage signal for driving the focusing lens to move from a position remote from the optical disk to a focus servo-controllable position while a focus servo loop is open, and for providing a sum output;
    driver amplifier means receiving at its input the output of the adder means;
    motor means, which is moved in response to an output of the drive amplifier means, for moving the focusing lens;
    activatable logic circuit means which receives (1) a focus-ON signal for instructing movement of the focusing lens into the focus servo-controllable position, (2) the focus error signal and (3) a tracking signal;
    integrating means for producing, as an output, the focus lens drive voltage signal, of either rising form or descending form, whereby the focusing lens is moved towards and away from the disk according to the form of the drive voltage signal; and
    controlling means for controlling the integrating means so that the output of the integrating means has either a voltage-rising form or a voltage-descending form;
    the logic circuit means being activated in response to the focus-ON signal, and the activated logic circuit means being arranged to provide a first output to the controlling means to cause the drive signal produced by the integrating means to retract the focusing lens away from, and then advance the focusing lens towards, the disk, and also being arranged to provide a second output to the controlling means to cause the drive signal produced by the integrating means not to advance the focusing lens further towards the disk, the activated logic circuit means (1) switching from providing the first output to providing the second output in response to the focus error signal's crossing a predetermined threshold value and (2) switching from providing the second output to providing the first output in response to the tracking signal's changing to indicate a loss of tracking information.

* * * * *